(12) United States Patent
Marquezan et al.

(10) Patent No.: US 12,160,771 B2
(45) Date of Patent: Dec. 3, 2024

(54) DEVICE AND METHOD FOR USER EQUIPMENT REGISTRATION ASSISTED BY ANALYTICS TO SUPPORT INTRA- AND INTER-NETWORK SLICE LOAD BALANCING

(71) Applicant: Huawei Technologies Co., Ltd., Shenzhen (CN)

(72) Inventors: Clarissa Marquezan, Munich (DE); Riccardo Trivisonno, Munich (DE); Qing Wei, Munich (DE); Xiaobo Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 561 days.

(21) Appl. No.: 17/171,863

(22) Filed: Feb. 9, 2021

(65) Prior Publication Data

US 2021/0168651 A1   Jun. 3, 2021

Related U.S. Application Data

(63) Continuation of application No. PCT/EP2018/071679, filed on Aug. 9, 2018.

(51) Int. Cl.
*H04W 28/086* (2023.01)
*H04W 24/02* (2009.01)
(Continued)

(52) U.S. Cl.
CPC ......... *H04W 28/086* (2023.05); *H04W 24/02* (2013.01); *H04W 24/08* (2013.01); *H04W 28/088* (2023.05)

(58) Field of Classification Search
CPC . H04W 24/02; H04W 24/08; H04W 28/0838; H04W 28/09; H04W 28/0942; H04W 48/18
See application file for complete search history.

(56) References Cited

U.S. PATENT DOCUMENTS 8,811,985 B2   8/2014 Tanabe et al.
9,723,437 B1 *  8/2017 Bitra ............... H04W 64/00
(Continued)

FOREIGN PATENT DOCUMENTS

CN   107395388 A   11/2017
WO   2015082071 A1   6/2015

OTHER PUBLICATIONS

"NSSF uses NWDAF's Service to select network slice(s)," 3GPP TSG-SA2 Meeting #127-Bis, S2-184732, Newport Beach, US, Total 4 pages, 3rd Generation Partnership Project, Valbonne, France (May 28-Jun. 1, 2018).
(Continued)

*Primary Examiner* — Zhensheng Zhang
(74) *Attorney, Agent, or Firm* — Leydig, Voit & Mayer, Ltd.

(57) ABSTRACT

The present disclosure relates to performing mobile network configurations or changes. A first device is presented for performing the mobile network configuration or change, and a second device is presented for generating feedback for supporting the mobile network configuration or change. The first device is configured to send a support request to the second device, wherein the support request specifies a reusable or specific feedback type and a target information. The second device is configured to send reusable or specific feedback about the target information in response to the support request. The first device is then configured to determine a configuration or change of the mobile network based on the reusable or specific feedback. The reusable feedback includes a value or set of values of the target information and at least one coordination parameter indicating how the reusable feedback is to be used by multiple second devices.

17 Claims, 6 Drawing Sheets

(51) Int. Cl.
  *H04W 24/08* (2009.01)
  *H04W 28/088* (2023.01)

(56) References Cited

U.S. PATENT DOCUMENTS 9,967,791 B2  5/2018  Roeland et al.
2017/0332212 A1  11/2017  Gage

OTHER PUBLICATIONS

Mannwiler et al., "5G Mobile Network Architecture for diverse services, use cases, and applications in 5G and beyond, Deliverable D2.2, Initial overall architecture and concepts for enabling innovations," 5G-MoNArch, Project No. 761445, Ref. Ares(2018)3534754, pp. 1-111 (Jul. 3, 2018).

"A solution to provide the available analytic information metadata," SA WG2 Meeting #128, S2-186724, Vilnius, Lithuania, Total 3 pages, 3rd Generation Partnership Project, Valbonne, France (Jul. 2-6, 2018).

"Solution 2 update: Content of Network Data Analytics Feedback," 3GPP TSG-SA WG2 Meeting #128, S2-187258, Vilnius, Lithuania, Total 3 pages, 3rd Generation Partnership Project, Valbonne, France (Jul. 2-6, 2018).

"3rd Generation Partnership Project; Technical Specification Group Services and System Aspects; Study of Enablers for Network Automation for 5G (Release 16)," 3GPP TR 23.791 V0.5.0, pp. 1-48, 3rd Generation Partnership Project, Valbonne, France (Jul. 2018).

"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401 V15.4.0, pp. 1-410, 3rd Generation Partnership Project, Valbonne, France (Jun. 2018).

"3rd Generation Partnership Project; Technical Specification Group Services and System Aspects; System Architecture for the 5G System; Stage 2 (Release 15)," 3GPP TS 23.501 V15.2.0, pp. 1-217, 3rd Generation Partnership Project, Valbonne, France (Jun. 2018).

"3rd Generation Partnership Project; Technical Specification Group Services and System Aspects; Procedures for the 5G System; Stage 2 (Release 15)," 3GPP TS 23.502 V15.2.0, pp. 1-308, 3rd Generation Partnership Project, Valbonne, France (Jun. 2018).

"3rd Generation Partnership Project; Technical Specification Group Services and System Aspects; Policy and Charging Control Framework for the 5G System; Stage 2 (Release 15)," 3GPP TS 23.503 V15.2.0, pp. 1-67, 3rd Generation Partnership Project, Valbonne, France (Jun. 2018).

"3rd Generation Partnership Project; Technical Specification Group Services and System Aspects; Management and orchestration of networks and network slicing; 5G Core Network (5GC) performance measurements and assurance data (Release 15)," 3GPP TS 28.553 V0.4.0, pp. 1-14, 3rd Generation Partnership Project, Valbonne, France (Jul. 2018).

"3rd Generation Partnership Project; Technical Specification Group Core Network and Terminals; 5G System; Session Management Event Exposure Service; Stage 3 (Release 15)," 3GPP TS 29.508 V15.0.0, pp. 1-31, 3rd Generation Partnership Project, Valbonne, France (Jun. 2018).

"3rd Generation Partnership Project; Technical Specification Group Services and System Aspects; Telecommunication management; Charging management; Charging architecture and principles (Release 15)," 3GPP TS 32.240 V15.2.0, pp. 1-59, 3rd Generation Partnership Project, Valbonne, France (Jun. 2018).

"3rd Generation Partnership Project; Technical Specification Group Services and System Aspects; Telecommunication management; Performance Management (PM); Performance measurements Evolved Packet Core (EPC) network (Release 15)," 3GPP TS 32.426 V15.0.0, pp. 1-92, 3rd Generation Partnership Project, Valbonne, France (Jun. 2018).

"3rd Generation Partnership Project; Technical Specification Group Core Network and Terminals; 5G System; Network Data Analytics Services; Stage 3 (Release 15)," 3GPP TS 29.520 V15.0.0, pp. 1-32, 3rd Generation Partnership Project, Valbonne, France (Jun. 2018).

* cited by examiner

DEVICE AND METHOD FOR USER EQUIPMENT REGISTRATION ASSISTED BY ANALYTICS TO SUPPORT INTRA- AND INTER-NETWORK SLICE LOAD BALANCING

CROSS-REFERENCE TO RELATED APPLICATIONS

This application is a continuation of International Application No. PCT/EP2018/071679, filed on Aug. 9, 2018, the disclosure of which is hereby incorporated by reference in its entirety.

TECHNICAL FIELD

The present disclosure generally relates to performing mobile network configurations and/or changes, in particular to performing registration of User Equipment (UE) to a Network Slice (NS) or Network Slice Instance (NSI) in the mobile network. According to the disclosure, the UE registration is assisted by analytics to enable e.g. intra and inter NS load balancing in 5G systems (5GS).

The present disclosure specifically presents a device for performing mobile network configurations and/or changes, and another device for generating feedback for supporting the mobile network configurations and/or changes. The present disclosure also presents anew type of feedback for assisting mobile network configurations and/or changes. The present disclosure further focuses on how to make the feedback available to and usable by multiple devices that perform the mobile network configurations and/or changes.

BACKGROUND

5GS defined by 3GPP from Rel. 15 on will support NSs. This means that a UE will be able to be associated with one or more NSs according to the type of services that it requires. For instance, enhanced Mobile Broadband (eMBB) and Ultra Reliable Low Latency Communications (URLLC) services will be deployed in different NSs, with different functionalities and Quality of Service (QoS) requirements. In addition, for the same type of NSs (i.e. for NSs with the same Single Network Slice Selection Assistance Information (S-NSSAI)) there will be different NSIs (i.e., NSI IDs), and within the same NS, the UE traffic can be handled by different NSIs.

Conventionally, a UE and network association process starts with the UE sending a registration request to the Core Network (CN). The appropriate CN Network Function (NF) determines an allowed list of NSs and NSIs, and returns the allowed list to the UE. This diversity creates a complexity when defining, at the UE registration, the best set of NSs and NSIs allowed to be used by the UE.

In Rel. 15, it is already defined that some sort of analytics, as provided by a Network and Data Analytics Function (NWDAF), about the network load can be used by a Network Slice Selection Function (NSSF) to support the NS selection during UE registration. This is one way of performing NS selection. However, no precise information or interactions between the NSSF and the NWDAF are specified in Rel. 15.

A second way of performing NS selection, according to the 3GPP 23.502 specification, is that the NS selection (which is equivalent to defining the list of allowed S-NSSAIs for a UE registration) may be performed directly by an Access Management Function (AMF). In this case, the AMF will keep performing the UE registration without considering any load information about the NSIs associated with S-NSSAIs, nor will it consider the past behavior of the UE.

Moreover, also all other proposals for NS selection mention at best a network load as a parameter for the selection process.

Notably, the problems described above for the case of UE registration at a NS and/or NSI (which is an exemplary mobile network configuration or change), also arise when performing other network configurations and/or changes. Generally, any mobile network configuration and/or change is currently not performed with precise enough information, e.g. without knowledge of load information about individual NSs and/or NSIs. Also a historical behavior of UEs is not usually taken into account.

SUMMARY

In view of the above-mentioned problems, the present disclosure presents improvements to conventional solutions for configuring and/or changing mobile networks, particularly solutions for UE registration at a NS and/or NSI. Embodiments of the present disclosure enable, based on the usage of certain analytics, a smarter configuration and/or change of a mobile network, particularly a smarter selection of a NS and/or NSI for UE registration. The present disclosure addresses, inter alia, the following issues:

1. How to generate the analytics (and how to generate a feedback based on the analytics) to support the configuration and/or change of the mobile network, particularly the UE registration to a NS and/or associated NSI, with best capacity to fulfil services requested by UEs (e.g. based on past UE behavior).
2. How one or more NFs, which perform configuration and/or change of the mobile network, particularly NS selection, use the feedback of the analytics to select the best mobile network configurations and/or changes, particularly the best NSI or NS type (i.e., S-NSSAI) for UE registration. "Best" means, for instance, to enable load balancing among NSIs from the same NS (intra NS) and among equivalent NSs (inter NS).

The present disclosure proposes a device for generating feedback for performing the mobile network configuration and/or change, and a device for using the feedback to perform the mobile network configuration and/or change.

For example, the present disclosure considers NS selection and UE registration at the NS as the mobile network configuration or change. For this example, the disclosure proposes to enhance the capabilities of NFs configured to perform the NS selection (e.g., in 3GPP systems the NSSF and AMF) based on analytics received as a new kind of feedback from an Analytics Function (e.g., NWDAF). This enables 5GS to achieve, at a system level, the load balancing within the NSIs associated to the same NS (intra NS load balancing) and among NSIs associated with different NSs (inter NS load balancing), namely by distributing the UEs at registration among the NSs and NSIs with the capacity to support UE traffic (based, for example, on the analysis of UE historical behavior). Such load balancing may be achieved by generating analytics that combine historical UE information with actual load of the NSs and NSIs. Feedback generated based on this analytics may be taken in to consideration by the NFs when performing UE registration, especially during the generation of the allowed list of NSs and NSIs to be associated with the response to the UE registration request.

The main advantages thereby can be summarized as:

Beyond static information and/or only NSI load are enabled to be used for the determination of allowed NSs and NSIs to be associated with UEs at registration, namely by using UE-driven information combined with network load information for this decision making. This result in the advantage of 5GS achieving NSI load balancing (intra NS and/or inter NS) among UEs allowed to share NSIs at a very early stage which leads to potential:

Session setup failure rates are reduced.

The need for UPF re-selection is reduced.

Changes in PCF policies (e.g., to downgrade traffic to cope with high load in a network slice instance) are reduced.

A first aspect of the disclosure provides a device for generating feedback for supporting a mobile network configuration and/or change, the device being configured to receive a support request from a device for performing the mobile network configuration and/or change, wherein the support request specifies a reusable and/or specific feedback type and a target information, and send reusable and/or specific feedback about the target information in response to the support request, wherein the reusable feedback includes a value or set of values of the target information and at least one coordination parameter indicating how the reusable feedback is to be used by multiple devices performing mobile network configuration and/or change, and wherein the specific feedback includes a value or set of values of the target information and at least one organization parameter for the set of values.

Based on the new kind of feedback, which may be generated based on analytics obtained by the device of the first aspect, the device or devices, which perform the mobile network configuration and/or change, can perform it in a smarter way. That is, these devices are provided more relevant knowledge to select the best way to perform the mobile network configuration and/or change.

The reusable feedback can specifically be consumed by multiple such devices for performing the configuration and/or changes of the mobile network. The feedback supports these devices in their decisions and actions, and allows them to coordinate. The feedback indicates, for instance, how these devices should use the feedback including values of the target information. Thus, they can coordinate their configurations and/or changes, and can prevent or minimize the triggering of simultaneous and/or unnecessary configurations and/or changes of the mobile network. The reusable feedback for example influence the decision making at any of these devices concerning selection of a NS and/or NSI to register a UE with. To this end, the feedback may provide the devices with a set of values, like a current load of all NS and/or NSIs, and the devices can then use this information for their decisions on the NS and/or NSI.

The specific feedback can specifically be used to directly support a device in its performing of the mobile network configuration and/or change. It particularly, the feedback may directly steer a decision making of the device, e.g. which NS and/or NSI to register a UE with. To this end, the feedback may provide the device with a decision criterion, e.g. in the form of a ranking, e.g. of current loads, e.g. lowest to highest, of multiple NSs and/or NSIs.

In an implementation form of the first aspect, the mobile network configuration and/or change includes a registration of UE to a NS and/or NSI and/or the target information is information about at least one NS and/or NSI capable of supporting traffic requirements of the UE, particularly based on historical UE behavior.

As mentioned above, one possible network configuration and/or change is the registration of a UE to a NS and/or NSI. Thus, a target information relevant to this case should be provided. The device performing the UE registration can use the information about which NSs and/or NSIs are capable to accommodate the UE traffic requirements, to select one or more accordingly.

In a further implementation form of the first aspect, the device is further configured to collect data about a network configuration and/or change, particularly about at least one NS, NSI and/or UE, and generate the reusable and/or specific feedback based on the collected data.

Thus, the device of the first aspect can generate the feedback based on analytics, and thus can allow a device to perform a mobile network configuration and/or change in a smarter way, i.e. based on more and relevant information. For example, multiple sets of data/information, which can be used to support the device of the first aspect to influence devices performing mobile network configurations and/or changes are: the characteristics of the deployed NSIs; and/or sets of equivalent NSIs and/or NSs; historical data related to the past UE behavior on NSs and/or NSIs; the dynamic load of the NS and NSI etc.

In a further implementation form of the first aspect, the data about at least one NS, NSI and/or UE includes one or more of: past behavior of the UE, NS and/or NSI configuration information, NS and/or NSI network load, a mapping of a plurality of equivalent NSIs.

In a further implementation form of the first aspect, the data about at least one NSI includes one or more of: NS and NSI mapping, NSI topology information, Mobile Service Level, MSL, information mapping to NS and NSI topology, Radio Access Network (RAN) and Core Network (CN) association, RAN configuration information associated with the NSI.

In a further implementation form of the first aspect, the data about at least one NS includes one or more of: a network load of the NS and/or of one or more NSIs of the NS, a network latency and/or network throughput per type of service, a notification about a Quality of Service (QoS) non-fulfillment, QoS experienced by one or more UEs of a given type of service.

In a further implementation form of the first aspect, the data about at least one UE includes one or more of: a session historical behavior of the UE and/or of one or more other UEs, a type of services or application used in the past by the UE and/or by one or more other UEs, a network usage per UE, particularly a volume of traffic and/or duration of session, per session, per NS, per NSI and/or per application and per UE.

Based on such data as described in the above implementation forms, useful reusable and/or specific feedback can be generated, in order to allow smarter mobile network configurations and/or changes.

In a further implementation form of the first aspect, the support request includes at least one NS requested by a UE or at least one default NS for a UE and the UE identification as the target information, and the reusable feedback includes a current load value for at least one NS and/or NSI and/or a capability of the NS and/or NSI to accommodate the UE traffic requirements, particularly based on historical UE behavior.

This implementation form gives an example on how the reusable feedback can be used. The current load values are the values associated with the target information (i.e. NSs). A coordination parameter can e.g. determine that after the reusable feedback has been used by one device for registering the UE, any other device for performing mobile network configuration and/or change will discard the feedback.

In a further implementation form of the first aspect, the support request includes at least one NS requested by UE or at least one default NS for UE and the UE identification as the target information, and the specific feedback includes a current load value for multiple NSs and/or NSIs and a ranking of the NSs and/or NSIs according to their current load values and/or a capability of the NS and/or NSI to accommodate the UE traffic requirements, particularly based on historical UE behavior.

This implementation form gives an example on how the specific feedback can be used. The current load values are the values associated with the target information (i.e. NSs). The ranking is in this case the organization parameter, as it organizes the values e.g. from lowest to highest or vice versa. The organization parameter can be used as decision criterion for the device performing the configuration and/or change of the mobile network.

A second aspect of the disclosure provides a device for configuring and/or changing a mobile network, the device being configured to send a support request to a device for generating feedback for supporting the configuration and/or change of the mobile network, wherein the support request specifies a reusable and/or specific feedback type and a target information, receive a reusable and/or specific feedback about the target information in response to the support request, and determine a configuration and/or change of the mobile network based on the reusable and/or specific feedback, wherein the reusable feedback includes a value or set of values of the target information and at least one coordination parameter indicating how the reusable feedback is to be used by multiple devices performing mobile network configuration and/or change, and wherein the specific feedback includes a value or set of values of the target information and at least one organization parameter for the set of values.

By basing the determination of the configuration and/or change on the feedback received from the supporting device, the device of the second aspect can perform the configuration and/or change it in a smarter way, i.e. with more information available. Thus, it can for instance chose the best among multiple possible configurations and/or changes.

In an implementation form of the second aspect, the mobile network configuration and/or change includes a registration of UE to a NS and/or NSI, and/or the target information is information about at least one NS and/or NSI capable of supporting traffic requirements of the UE, particularly based on historical UE behavior.

Thus, in particular, UE registration at a NS and/or NSI can be performed in a smarter way.

In a further implementation form of the second aspect, the device is further configured to subscribe to a service provided by the device for generating the feedback, in order to enable support requests and reception of reusable and/or specific feedback.

In this way, the device is able to perform the configuration and/or change in a smarter and more efficient manner. The subscription and/or requested service of the device for generating the feedback may be defined at least with the feedback type, meta-data of feedback data structure, feedback category etc.

In a further implementation form of the second aspect, the device is further configured to collect auxiliary information, if the reusable and/or specific feedback is found insufficient to determine the at least one mobile network configuration and/or change, and determine the at least one mobile network configuration and/or change based further on the collected auxiliary information.

A third aspect of the disclosure provides a method for generating feedback for supporting a mobile network configuration and/or change, the method comprising: receiving a support request, wherein the support request specifies a reusable and/or specific feedback type and a target information, and sending reusable and/or specific feedback about the target information in response to the support request, wherein the reusable feedback includes a value or set of values of the target information and at least one coordination parameter indicating how the reusable feedback is to be used by multiple devices performing mobile network configuration and/or change, and wherein the specific feedback includes a value or set of values of the target information and at least one organization parameter for the set of values.

In an implementation form of the third aspect, the mobile network configuration and/or change includes a registration of UE to a NS and/or NSI and/or the target information is information about at least one NS and/or NSI capable of supporting traffic requirements of the UE, particularly based on historical UE behavior.

In a further implementation form of the third aspect, the method further comprises collecting data about a network configuration and/or change, particularly about at least one NS, NSI and/or UE, and generating the reusable and/or specific feedback based on the collected data.

In a further implementation form of the third aspect, the data about at least one NS, NSI and/or UE includes one or more of: past behavior of the UE, NS and/or NSI configuration information, NS and/or NSI network load, a mapping of a plurality of equivalent NSIs.

In a further implementation form of the third aspect, the data about at least one NSI includes one or more of: NS and NSI mapping, NSI topology information, Mobile Service Level, MSL, information mapping to NS and NSI topology, Radio Access Network (RAN) and Core Network (CN) association, RAN configuration information associated with the NSI.

In a further implementation form of the third aspect, the data about at least one NS includes one or more of: a network load of the NS and/or of one or more NSIs of the NS, a network latency and/or network throughput per type of service, a notification about a Quality of Service (QoS) non-fulfillment, QoS experienced by one or more UEs of a given type of service.

In a further implementation form of the third aspect, the data about at least one UE includes one or more of: a session historical behavior of the UE and/or of one or more other UEs, a type of services or application used in the past by the UE and/or by one or more other UEs, a network usage per UE, particularly a volume of traffic and/or duration of session, per session, per NS, per NSI and/or per application and per UE.

In a further implementation form of the third aspect, the support request includes at least one NS requested by a UE or at least one default NS for a UE and the UE identification as the target information, and the reusable feedback includes a current load value for at least one NS and/or NSI and/or a capability of the NS and/or NSI to accommodate the UE traffic requirements, particularly based on historical UE behavior.

In a further implementation form of the third aspect, the support request includes at least one NS requested by UE or at least one default NS for UE and the UE identification as the target information, and the specific feedback includes a current load value for multiple NSs and/or NSIs and a ranking of the NSs and/or NSIs according to their current load values and/or a capability of the NS and/or NSI to accommodate the UE traffic requirements, particularly based on historical UE behavior.

The method of the third aspect achieves the same advantages and effects as described above for the device of the first aspect and its respective implementation forms.

A fourth aspect of the disclosure provides a method for configuring and/or changing a mobile network, the method comprising: sending a support request, wherein the support request specifies a reusable and/or specific feedback type and a target information, receiving a reusable and/or specific feedback about the target information in response to the support request, and determining at least one mobile network configuration and/or change based on the reusable and/or specific feedback, wherein the reusable feedback includes a value or set of values of the target information and at least one coordination parameter indicating how the reusable feedback is to be used by multiple devices performing mobile network configuration and/or change, and wherein the specific feedback includes a value or set of values of the target information and at least one organization parameter for the set of values.

In an implementation form of the fourth aspect, the mobile network configuration and/or change includes a registration of UE to a NS and/or NSI, and/or the target information is information about at least one NS and/or NSI capable of supporting traffic requirements of the UE, particularly based on historical UE behavior.

In a further implementation form of the fourth aspect, the method further comprises subscribing to a service provided by the device for generating the feedback, in order to enable support requests and reception of reusable and/or specific feedback.

In a further implementation form of the fourth aspect, the method further comprises collecting auxiliary information, if the reusable and/or specific feedback is found insufficient to determine the at least one mobile network configuration and/or change, and determine the at least one mobile network configuration and/or change based further on the collected auxiliary information.

The method of the fourth aspect achieves the same advantages and effects as described above for the device of the first aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of specific embodiments in relation to the enclosed drawings, in which.

DETAILED DESCRIPTION OF EMBODIMENTS

Figure 1:
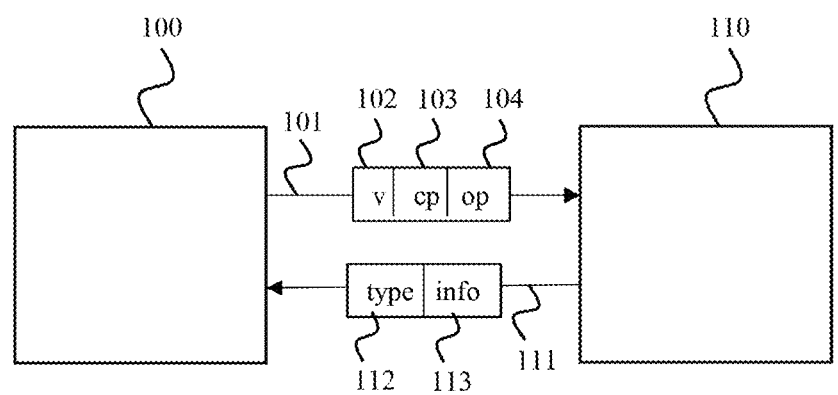
FIG. 1 shows a device for generating feedback for supporting a mobile network configuration and/or change, and shows a device for performing a mobile network configuration and/or change, respectively, according to embodiments.

FIG. 1 shows a device 100 according to an embodiment, and a device 110 according to another embodiment. The devices 100 and 110 form together a system according to an embodiment. The device 110 is particularly configured to perform a network configuration and/or change, e.g. to perform or support a UE registration to a NS and/or NSI. The device 100 may be, may comprise, or may be configured to implement, an Analytics Function, e.g. a NWDAF. The device 100 is particularly configured to generate feedback (i.e., analytics) for supporting the mobile network configuration and/or change of the device 100. The device 110 may be, may comprise, or may be configured to implement, a NF, NSSF, or AMF.

The device 100 is configured to send a support request 111 to the device 100, wherein the support request 111 specifies a reusable and/or specific feedback type 112 ("type") and a target information 113 ("info"). Accordingly, the device 100 is configured to receive the support request 111 from the device 110.

The device 100 is further configured to send reusable and/or specific feedback 101 about the target information 113 in response to the support request 111 of the device 110. That is, the feedback 101 is generated and sent according to the feedback type 112 in the support request 111, and concerns the target information 113 indicated in the support request 111. Accordingly, the device 110 is configured to receive the reusable and/or specific feedback 101 about the target information 113 in response to its support request 111 from the device 100.

The device 110 is then configured to determine a configuration and/or change of the mobile network based on the reusable and/or specific feedback 101. The reusable feedback 101 particularly includes a value 102 or set of values 102 ("v") of the target information 113 and at least one coordination parameter 103 ("cp") indicating how the reusable feedback is to be used by multiple devices 110 performing mobile network configuration and/or change. The specific feedback 101 particularly includes a value 102 or set of values 102 of the target information 113 and at least one organization parameter 104 ("op") for the set of values 102.

As mentioned above, the device 100 may be an Analytics Function. In this case, the Analytics Function 100 may be provided with the following capabilities:

Generate the reusable and/or specific feedback 101.

The reusable feedback 101 may be a type of feedback (analytics) generated by the Analytics Function 100, which can be consumed by any device 110 configured to perform mobile network configuration and/or change, e.g. any NF, application, and/or OAM. In addition to one or more values 102 with regard to the target information 113 (e.g., calculated KPIs), the reusable feedback 101 may also include the coordination parameter 103, which is intended to support that different NFs, application, and/or OAM consume reusable feedback 101 and at the same time avoid triggering simultaneous and potentially unnecessary changes in 5GS network.

The specific feedback 101 may be a type of feedback (analytics) generated by the Analytics Function 100, in order to have a direct impact on and/or to be used exclusively by a specific device 110 configured to perform a configuration and/or change of the network, because the content of the specific feedback 101 is designed to be relevant for the target device 110 (consumer).

Collect data about at least one of:

Past UE historical behavior (e.g., session usage in specific network areas) where the exact granularity of the past data to be collected can be parametrized.

NS and NSI configuration information (such as at least topology, NS RAN configuration such as tracking area, AN and tracking area association).

Actual NS and NSI network load (e.g., active sessions, notification of QoS control, CN latency, etc.).

Mapping of equivalent NSIs either within the same NS (intra NS equivalence) or among different NSs (inter NS equivalence).

Offer one or more services that allow consumers (i.e. devices 110) to register/request and be notified or retrieve the types of feedbacks 101, reusable and/or specific, as described herein.

As mentioned above, the device 110 may be a NF for performing a configuration and/or change of a mobile network, e.g. NS selection. In this case, the NF 110 may be provided with the following capabilities:

Receive the reusable and/or specific feedback 101 from the device 100 (e.g. the above Analytics Function 100), either via subscribe/notify or via request/response modes communication models.

Use the received feedback 101 (and optionally collect further information, if necessary) to decide on a mobile network configuration and/or change, e.g. on a list of allowed NSs and NSI for NS selection and UE registration.

Figure 2:
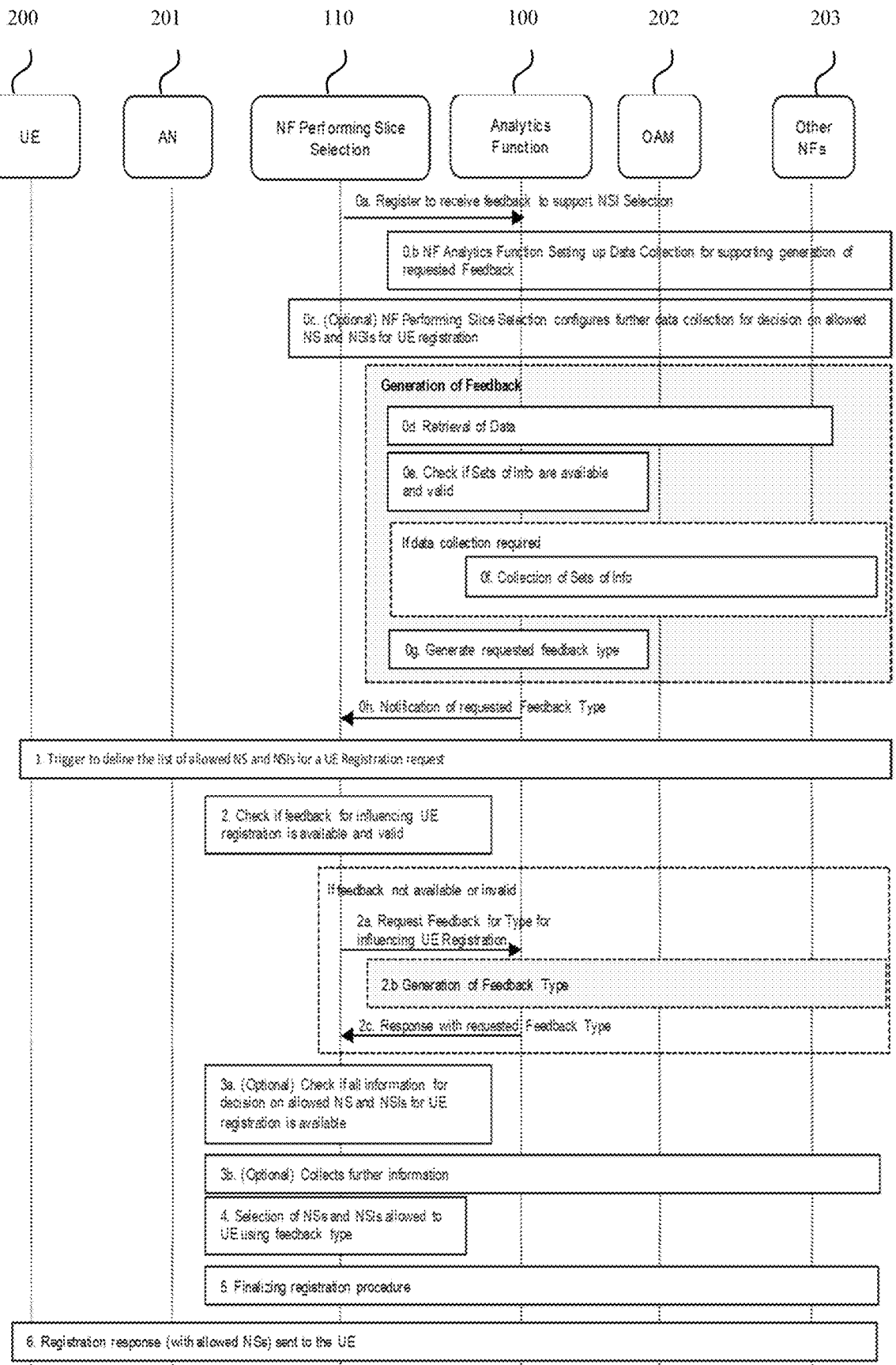
FIG. 2 shows a flow diagram of a procedure, in which analytics (i.e., feedback) are used to influence UE registration.

FIG. 2 shows a flow diagram of an exemplary procedure, in which analytics (i.e., feedback) are used to influence registration of a UE 200. Entities shown in FIG. 2 are the UE 200, a NF 110 (acting as the device 110 for performing NS selection shown in FIG. 1), an Analytics Function 100 (acting as the device 100 for generating the feedback 101 for supporting the NS selection, as shown in FIG. 1) an Access Network (AN) 201, Operations, Administration and Maintenance (OAM) 202, and other NFs 203. The illustrated steps are described below.

0. The steps 0a-0c are performed before any UE registration request reaches the NF 110. The steps 0d-0h may be executed periodically by the Analytics Function 100. This periodicity can be parametrized.

0a. The NF 110 registers, in order to receive the at least one feedback 101 to influence its decision making of selecting the allowed NSs and NSIs for UE 200 registration.

0b. The Analytics Function 100 triggers a configuration and collection of data ("Sets of Info") to be used for the generation of the requested feedback 101.

0c. Optionally, the NF 110, if necessary, triggers a configuration and data collection, in order to support its decision making of selecting the allowed NSs and NSIs for UE 200 registration.

0d. The Analytics Function 100 receives (if subscribe/notify is used for data collection) or retrieves (in the case of request/response data collection) the data ("Sets of Info") to assist the generation of the requested feedback 101.

0e. The Analytics Function 100 checks if the Sets of Info required to generate the subscribed/requested feedback types 112 are available and valid. The availability of a Set of Info refers to the information being under the scope of the Analytics Function 100 (e.g., in a database of the Analytics Function 100), while the validity of a Set of Info refers to the check, if the timestamp of when the information was collected is still within the interval of time configured at Analytics Function 100 that indicates the expiration time of Sets of Info to be used for generating feedback types 112.

0f. The Analytics Function 100 triggers the collection of the data (Sets of Info) to support the generation of the feedback type for unavailable or invalid Sets of Info.

0g. The Analytics Function 100 generates the requested feedback type 112.

0h. The Analytics Function 100 notifies the generated feedback type 112 to the consumers, e.g. the NF 110, of such feedback 101.

1. This step includes all the steps from the UE 200 sending the registration request to the AN 201, triggering other NFs 203 (if this is the case), until the step where the NF 110 that will actually perform the determination of the allowed list of NS and NSIs for the UE registration request, is activated (e.g., receives the request from other NF 203).

2. The NF 110 checks if feedback from the Analytics Function 100 to influence the UE registration is available and valid (the same concepts of availability and validity apply for the NF 110 performing NS selection). If feedback is unavailable or invalid:

2a. The NF 110 requests from the Analytics Function 100 the feedback type 112 for influencing UE Registration.

2b The Analytics Function 100 executes the steps 0d-0g for generating the requested feedback type 112 for influencing UE Registration.

2c. The Analytics Function 100 sends the response to the NF 110 with the feedback 101 generated according to the requested feedback type 112.

3. Optionally, this step can be executed by the NF 110 in parallel to step 2.

3a. The NF 110 checks if the Sets of Info, in addition to the feedback type 112 from the Analytics Function 100, to influence UE registration are available and valid.

3b. If the Sets of Info are not available or valid, the NF 110 requests the required information from data sources.

4. The NF 110 defines the list of allowed NSs and associated NSIs for the UE registration request using the received feedback 101 from the Analytics Function 100, and optionally using the further collected information.

5. Further steps potentially involving other NFs 203 required for finalizing the UE registration procedure may be executed.

6. A registration response with the allowed NSs is sent to the UE 200, which requested registration.

In the following, the above-mentioned data (also referred to as "Sets of Info"), which are to be collected for the Analytics Function 100, in order to generate the feedback 101, are explained in more detail. Three different types of such Sets of Info can in particular be distinguished:

Set of Info 1 (related to the characteristics of the deployed NSIs, i.e. data about at least one NSI):

The goal is to support the device 100 (e.g. Analytics Function 100), which produces the feedback/analysis on the identification of network load.

Information elements to be considered in this Set of Info are at least:

NS and NSI mapping, e.g., which NSI ID are associated with an S-NSSAI.

NSI topology information (e.g., mapping of which NFs are associated with which regions of the NSI and NS).

MSL information (e.g., tracking area, registration area, etc.) mapping to NS and NSI topology.

RAN and Core association (e.g., which AN is associated with NFs in the core such as AMF).

RAN configuration information associated with an S-NSSAI (e.g., tracking area and AN association).

Equivalent NSI set, i.e. the set of NSIs (NSI IDs), which are able to satisfy the requirement of one S-NSSAI. The equivalent NSI set is defined based on operator policy and actual slice deployment. For instance:

Equivalent NSI in the intra S-NSSAI: multiple NSIs deployed at different parts of PLMN for the same S-NSSAI.

Equivalent NSI in inter S-NSSAIs: NSIs which are able to satisfy the requirements of different S-NSSAIs (e.g., operator can use an eMBB NSI to cover the case of mioT if they prefer to).

Set of Info 2 (historical data related to the UE 200 behavior on NS and/or NSI, i.e. data about at least one UE 200):

The goal is to assist analysis whether selected NS/NSIs would be able to support the behavior of the UE 200 in terms of traffic requirements of the UE based on historical information.

Information elements to be considered in this Set of Info are at least:

Type of services/applications used in the past per UE 200 (e.g., URLLC, eMBB, etc.)

Network usage per UE 200 (e.g., information per UE session duration and volume at certain areas of the AN and CN network)

Set of Info 3 (related to the dynamic load of the NS and NSI, i.e. data about at least one NS):

The goal is to verify the actual traffic conditions for the NSIs×per NSs×per network regions×per type of traffic in the NSIs.

Information elements to be considered in this Set of Info are at least:

Network latency and throughput (AN and CN) per type of service (e.g., calculated based on 5QI or Application ID, etc. . . . . . )

Notifications about QoS non-fulfilment

Rejection rates of procedures at NFs associated with UEs connectivity (e.g., registration, session establishment, mobility, etc.)

In the following is next described, a possible implementation of a solution with 3GPP 5GS based on the Rel. 15. In particular, in this implementation, the NWDAF in 3GPP is enhanced based on the functions of the above-explained device 100 (particularly the Analytics Function 100). Thus, the NWDAF 100 is configured to generate the feedback 101 for supporting configuration and/or change of the mobile network. Further, NFs performing UE registration can be either NSSFs or AMFs, because according to Rel.15 these are the entities involved in selecting the S-NSSAIs and NSI IDs which are equivalent to NS and NSI, respectively. Thus, an NF 110 (NSSF or AMF) is configured to perform the mobile network configuration and/or change based on the feedback 101.

First will be described the operations of the interfaces of the NWDAF 100 with the extensions to expose the reusable and/or specific feedback 101. Second, the fields (including the embodiment for type 112 and info 113, cp 103, and op 104 described herein and shown in FIG. 1) included in these interfaces will be defined. Third, the Sets of Info used for the generation of the feedback 101 for assisting UE registration will be defined. Finally, one specific example for the procedure of UE registration with AMF re-allocation will be provided with respect to FIG. 3 and FIG. 4.

NWDAF Services for consuming reusable and/or specific feedback 101 may be implemented as shown in the following Table 1:

TABLE 1

| NWDAF Services for consuming reusable and/or specific feedback 101 | | |
|---|---|---|
| Service Name | Operation | Parameters of message |
| Nnwdaf_AnalyticsInfo | Request | Feedback Category (FC) Feedback Type (FT) Feedback Target Data Structure associated with Feedback Type (FTDS) Filters** Feedback Output ID** Feedback Type (FT) Feedback Target Data Structure Values (FTDS) Timestamp of output generation (TS) |
| Nnwdaf_EventSubscription | Subscribe | Feedback Category (FC) Feedback Type (FT) Feedback Target Data Structure associated with Feedback Type (FTDS) Filters** |

TABLE 1-continued

NWDAF Services for consuming reusable
and/or specific feedback 101

| Service Name | Operation | Parameters of message |
|---|---|---|
| | Notify | Feedback Output ID**<br>Feedback Type (FT)<br>Feedback Target Data<br>Structure Values (FTDS)<br>Timestamp of output<br>generation (TS) |

**Fields already defined in prior art.

New fields defined in the NWDAF interfaces to enable the UE registration and exposure of the defined feedback types 112 are designed as follows.

Feedback Category: the general description of the use cases associated with the desired feedback 101. It may be composed of the following fields:

Consumers Type (i.e., NFs, AFs, OAM);

Influenced Procedure, i.e. influenced mobile network configuration and/or change (e.g., UE registration, NF Selection, Slice Adjustment);

(Optional) Influenced Parameters (e.g., list of allowed network slices, list of NFs)

Feedback Type: specifies the feedback type 112, i.e. whether the desired feedback 101 is:

Reusable feedback 101 (i.e., the output of NWDAF 100 is an association of values 102 and/or set of values 102 to a desired target information 113 and at least one coordination parameter 104), or Specific feedback 101 (i.e., the output of NWDAF 100 is a specific value 102 or set of values 102 of the target information 113 and at least one organization parameter 104; the feedback 101 is to be consumed for supporting the decision making of a specific entity 110 e.g., NF, AF, OAM, or specific procedure, i.e. mobile network configuration and/or change).

Feedback Target Data Structure (FTDS): this field specifies the target object of the desired feedback 101 and a format of the target object depends on the feedback type 112.

Reusable Target Data Structure (RTDS): it is composed of a) information about the target object (or about an array of target objects) that needs to be analyzed by NWDAF 100. The target object may be part of type 112, for instance, the feedback type 112 may include a feedback type ID (which indicates reusable and/or specific feedback type 101) and the target object; and b) the target information 113 that needs to be associated with the target object. An example of a target object is: "per network slice, per application, per TA", and an example of target information 113 is "network load, UE experience satisfaction". The target object can be a tree or a nested list of objects, and the target information 113 can also be a list of information; and c) usage coordination parameter 103 which indicates how multiple consumers (devices 110) of the reusable feedback 101 should use the received feedback 101.

One possible embodiment for RTDS is:
Data structure definition:
  Reusable Target Data Structure=Array([info_type_tree, info_target], usage_coordination), where:
  Info_type_tree=(Root_level, (leaf_level))
  Root_level=Per UE|Per UE Application|Per NSI|Per S-NSSAI|Per Groups of UE|Per NF|Per DNN|Per PDU Session|etc.
  leaf_level=(Root_level, (leaf_level))|Empty
  info_target=target|(target_name, target_value_type, granularity)
  target=(target_name, target_value_type, granularity)|Empty
  granularity=indicates the characteristics of the data used for generating the feedback (e.g., sample interval)
  usage_coordination=for instance, NWDAF can indicate the only consumer that should use the reusable feedback, and another consumer of the same feedback will discard the information.

Specific Target Data Structure: is composed of:
d) target object (e.g. as part of feedback type 112); and
e) target information 113, both as defined in the Reusable Target Data Structure, and at least one organization parameter 114.
f) collection definition (may be part of the organization parameter 114), which describes how the values 102 of the target information 113 associated with the target object should be organized, for instance, if as an ordered list, or a queue, or a binary tree, etc.
g) criteria definition (may be part of the organization parameter 114) to be used to organize the values 102 into the collection, e.g., ascendant, descendent, high priority first, low priority first, etc.

One possible embodiment for the STDS is:
Data structure definition:
  Specific Target Data Structure=Array([collection_type, criteria_type, (Info_type_tree, info_target]]), where:
  Collection_type=ordered List|queue|stack|decision_tree, . . . .
  Criteria_type (Optional)=ascendant|descendent| . . . .

Feedback Target Data Structure Values, which contains values associated with either the requested RTDS or STDS data structures.

Timestamp of feedback generation, which allows consumers of the feedback 101 to decide until when the received information can be used. For instance, an NF 110 can deem a received notification from NWDAF 100 for a given feedback 101 as not valid based on this timestamp.

Examples of the Sets of Info for supporting the NWDAF 100 in obtaining the information (for supporting the smarter 3GPP UE Registration procedure) for generating specific feedback 101 are given in the following.

The information listed in the below Table 2 indicates measurements that need to be collected by NWDAF 100, in order to identify which are the predominant Applications used by the UE 200 as well as, the traffic load and the periodicity of such load that UE 200 imposes in the different areas of the network. The measurements presented in Table are pre-processed information based on the data collected from UE sessions at Service Management Function (SMF) and such data is described in Table 3. One possibility is to assume that the historical data about UE sessions (i.e., content of Table 3) is stored in Unified Data Repository (UDR) 300 (see FIG. 3) and that the NWDAF 100 collects the pre-processed data presented in Table 2. Another possible embodiment is to have the historical information about UE sessions stored at the OAM 202 and the NWDAF 100 collects this information from OAM 202.

TABLE 2

Input data to be collected by the NWDAF 100 related to UE historical data

| Information (all based on historical UE behavior) | Presence | Source | Description |
|---|---|---|---|
| Total number Sessions per Application, per AN, per S-NSSAI | M | UDR/OAM | Combining this information it is possible to identify which kind of applications are predominant in |
| Number of Sessions per Application, per AN, per S-NSSAI | | UDR/OAM | UE sessions (established in the past) |
| Number 5QI Flows per Application, per AN, per S-NSSAI | M | UDR/OAM | Support the comparison of current 5QIs Flows in the network regions with the past 5QIs used for the Applications of the UE |
| Volume of traffic per Application, per AN, per S-NSSAI | M | UDR/OAM | Identify regions in the network with most volume of traffic based on UE historical usage |
| Interval of time per Application, per AN, per S-NSSAI | M | UDR/OAM | Identify regions in the network with most duration of traffic based on UE historical usage |

TABLE 3

Information about each UE session to be used for generating UE historical data

| Information | Presence | Source | Description |
|---|---|---|---|
| UE ID | M | SMF | Identifies the UE that established the session |
| S-NSSAI | | SMF | Identifies the network slice of the established session |
| Session ID | M | SMF | Identifies the established session |
| NG-RAN ID | M | SMF | Identifies the NG-RAN transmitting traffic associated with an established session |
| Application ID | M | SMF | Identifies the Application ID associated with an established session |
| Data Network Name (DNN)ID | M | SMF | Identifies the data network associated with the established session |
| Volume | M | SMF | Indicates the volume of traffic transmitted in the established session for a given application, DNN, and in a given AN |
| Duration | M | SMF | Indicates the duration of sessions established for a given application, DNN, and in a given AN |

In order to be able to provide feedback 101 based on network regions, the NWDAF 100 shall collect from the OAM 202 the data related to the NS configuration, as described in the Table 4.

TABLE 4

Input data to be collected by NWDAF 100 related to NS configuration

| Information | Presence | Source | Description |
|---|---|---|---|
| Mapping AN x TA x S-NSSAI | M | OAM | Identify RAN regions |
| Mapping S-NSSAIs X NSI IDs | M | OAM | Identify RAN regions associated with network slices and network slice Instances |
| Equivalent NSIs | M | OAM | Identify equivalent NSIs (intra and inter S-NSSAIs) |

The NWDAF 100 may also use, as input for generating the feedback 101 for supporting NS selection during UE registration, the information about the network load. The characterization of network load may be done based on the parameters listed in the below Table 5. The parameters 1-5 identify the load at AN 201 in terms of combining information about: predominant traffic, QoS fulfilment, ratio of nominal versus actual throughput, where nominal is the value configured by OAM 202 at NS deployment. The parameters 6 and 7 determine how well the CN is performing in terms of latency and throughput. The parameters 8 and 9 determine if UPFs are overloaded. Finally, parameter 10 is related to the service experience and describes how many UE's service experience have been satisfied.

TABLE 5

Input data to be collected by the NWDAF 100 related to NS load

| ID | Information | Presence | Source | Description |
|---|---|---|---|---|
| 1 | Number Active flows per AN, per S-NSSAI | M | OAM | Combining both information it is possible to identify which 5QI flows are predominant per AN |
| 2 | Number Active flow per 5QI per AN, per S-NSSAI | M | OAM | |
| 3 | Number QoS Notification Control Messages per AN, per S-NSSAI | M | AMF/SMF/OAM | Identify per AN the ratio between active 5QI with Guaranteed Flow Bit Rate (GFBR) and non fulfilment of QoS at AN |
| 4 | Throughput UL/DL per AN per 5QI | O | OAM | Identify if the ratio between expected and actual throughput at AN |
| 5 | Nominal Throughput UL/DL per AN per 5QI | O | OAM | |
| 6 | PDB and Bit rate per 5QI | M | OAM | Identify if the ratio between expected and actual latency and throughput in CN |
| 7 | Latency and throughput per 5QI, per NSI path | M | OAM | |
| 8 | Ratio between successful and failed session establishment per S-NSSAI, per NSI IDs | O | OAM | Identify the chances of congestion of the UPF. |
| 9 | Ratio between successful and failed mobility management per S-NSSAI, per NSI IDs | O | OAM | |
| 10 | UE's service experience per Application, per S-NSSAI, per NSI IDs | O | NWDAF | Identify how many UE's service experience of applications per slice is being satisfied |

An implementation for 3GPP of UE Registration procedure based on specific feedback 101 is now described. Notably, there are different possible implementations for the solution described herein. One possible implementation for the UE Registration procedure in accordance with 3GPP 5GS Rel. 15 defined in TS 23.502 is disclosed and considers the following options:

Specific feedback type 112 is used to influence the UE 200 registration

Figure 4:
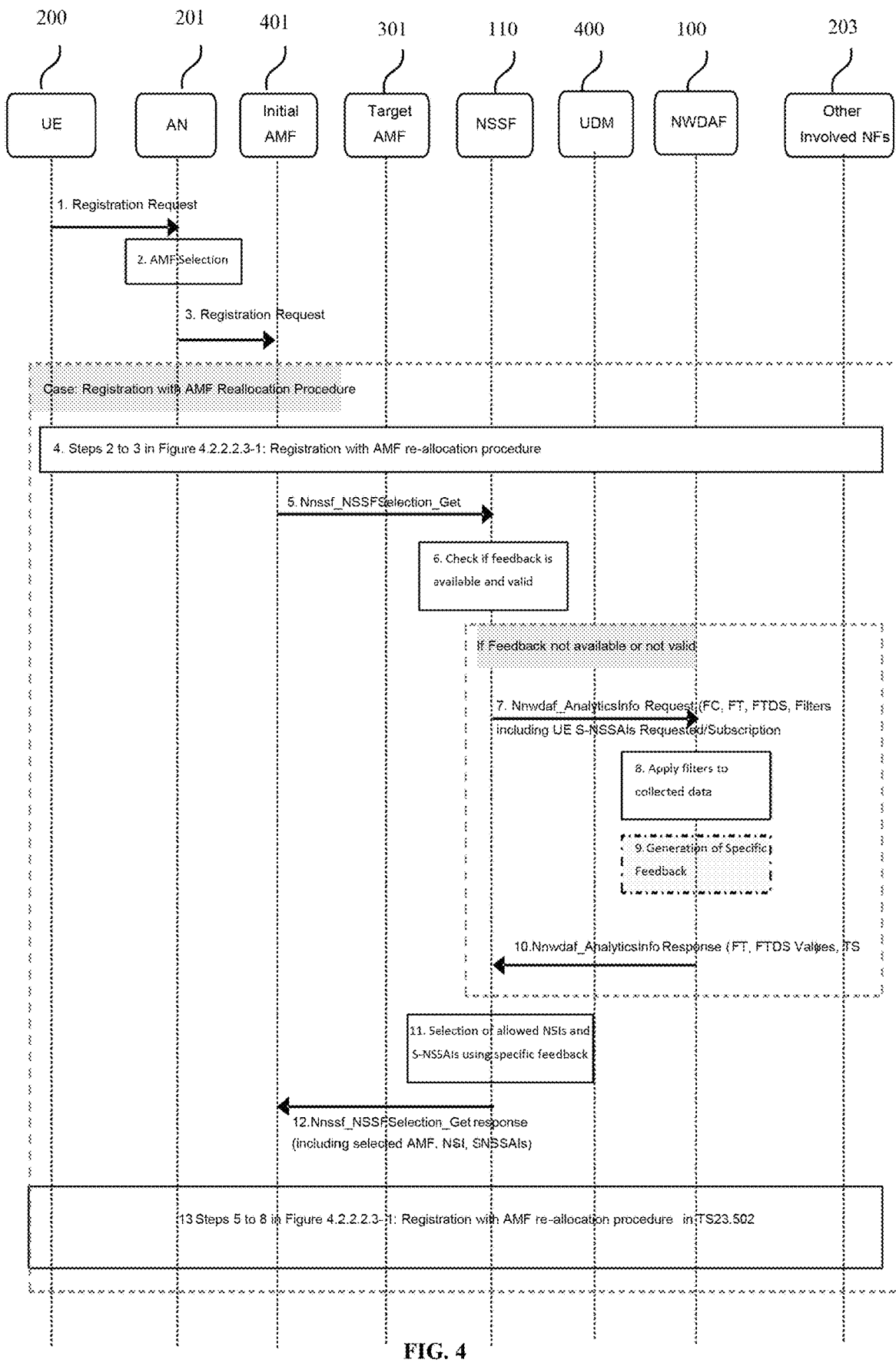
FIG. 4 shows a flow diagram of a procedure for a NWDAF to influence UE registration with AMF re-allocation using a specific feedback.

NSSF 110 is the NF performing NS selection, which means the procedure for UE Registration with AMF Reallocation originally described in Section 4.2.2.2.3, Figure 4.2.2.2.3-1 of 3GPP TS 23.502 is adapted to support the solution described herein.

The NSSF 110 will not collect further information (i.e. will not execute step 3 of the proposed method) for the decision-making of the allowed list of NS and NSIs to be associated with the UE requesting registration.

Figure 3:
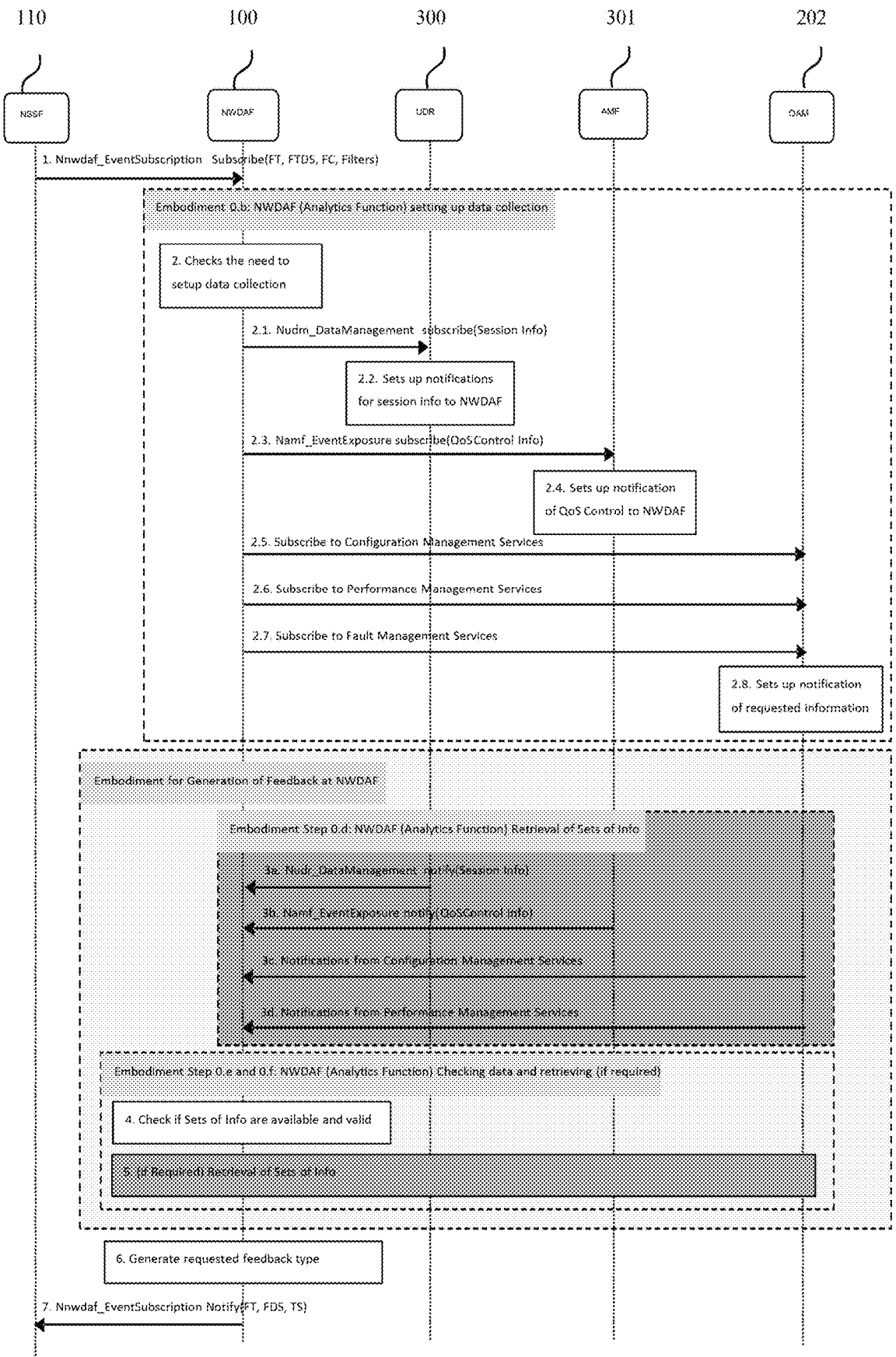
FIG. 3 shows a flow diagram of a procedure for setting up a data collection for generating analytics, in order to influence UE registration using a specific feedback.

The implementations of the steps 0, as described in FIG. 2, are illustrated in the embodiment for data collection on 3GPP 5GS as shown in FIG. 3. The implementations of the steps 1-6, as described in FIG. 2, are illustrated in FIG. 4 and represent the actual procedure for UE registration with AMF re-allocation according to 3GPP Rel. 15. The NSSF 110 performs the mobile network modification and/or change (taking the function of device 110 shown in FIG. 1), and the NWDAF 100 generates the feedback 101 for supporting the modification and/or change of the mobile network (taking the function of device 100 shown in FIG. 1).

The steps for NSSF 110 subscription to receive specific feedback from the NWDAF 100, as well as the data collection setup performed by the NWDAF 100 to retrieve the data sets described, in order to generate the requested specific feedback 101, are as follows. Notably, step 3 to 7 are executed periodically by NWDAF 100, and the periodicity can be configured.

1. The NSSF 110 invokes Nnwdaf_EventSubcription Subscription( ) service from NWDAF 100 indicating the specific feedback 101 it requires in order to consider the NWDAF feedback 101 during UE registration.
2. The NWDAF 100 checks if there is the need to setup data collection for supporting the requested specific feedback 101. If required, the NWDAF 110 will trigger the data collection set up for Sets of Info as shown above in Table 2, Table 4 and Table 5.
    2.1 The NWDAF 110 subscribes via Nudm_DataManagement subscribe( ) to receive information about historical session from UEs 200 from UDR 300.
    2.2 The UDR 300 setups the notification to NWDAF 100 about the requested historical information.
    2.3 The NWDAF 100 subscribes via Namf_EventExposure subscribe( ) to receive information about QoS Notification Control events from AMF 301.
    2.4 The AMF 301 setups the notification to NWDAF 100 about the requested QoS Notification control. It is up to configuration at AMF 301 to define whether every event will be propagated to the NWDAF 100, or if pre-processing will be applied to the QoS notification messages and such pre-processed information will be sent to NWDAF 100.
    2.5, 2.6, 2.7
        The NWDAF 100 subscribes to OAM 202 services to collect information, respectively, from Configuration management services, performance management services, and fault management services.
    2.8. OAM 202 setups the notification to NWDAF 100 about the requested information.
3. (a, b, c, d)
    Once the data collection for the generation of the specific feedback 101 is setup, the NWDAF 100 receives from the data sources the requested information.
4. Each data source might have its own cycle of notification, and information might not reach the NWDAF 100 at the same time. Therefore, the NWDAF 100 checks if all information required to generate the requested specific feedback 101 is available (i.e., if the NWDAF 100 received the information from the data source) and valid (i.e., this information is not expired).
5. If information required to generate requested specific feedback 101 is not available and/or not valid, the NWDAF 100 triggers the collection of the missing information.
6. The NWDAF 100 generates the requested specific feedback 101.
7. The NWDAF 100 exposes the requested specific feedback 101 for the subscribers of such feedback 101, in this case the NSSF 110.

FIG. 4 illustrates the steps in the procedure for UE registration with AMF re-allocation that are included in the procedure or modified by the solution described herein. The Steps 1 to 5 in FIG. 4 are exactly the same as in the current (conventional) procedure described in Section 4.2.2.2.3 of 3GPP TS 23.502. The steps 6 to 11 are the modifications introduced to enable the UE registration with AMF re-allocation to be influenced by the specific feedback. Steps 12 and further are again exactly the same as the ones existing in the current procedure.

1. The UE 200 sends the registration request to the AN 201.
2. The AN 201 performs AMF selection.
3. The AN 201 sends a UE registration request to an Initial AMF 401.
4. Steps 2 and 3 defined in Figure 4.2.2.2.3-1 in TS 23.502 for the Registration with AMF re-allocation procedure are executed.
5. The Initial AMF 401 invokes Nnssf_NSSFSelection_Get( ) operation to receive a list of allowed S-NSSAIs, NSI IDs, and a candidate list of AMFs, among other information.
6. The NSSF 110 checks, if the analytics (i.e., feedback) for supporting slice selection for UE registration are available (i.e., if the NSSF 110 received a notification with such analytics from the NWDAF 100) and if this analytics is still valid (i.e., if such analytics did not expire—the interval of time from receiving the analytics from NWDAF 100 up to the moment that it is actually needed by the NF is not expired). If analytics is available and valid, the NSSF 110 executes step 11, otherwise steps 7-10 are executed.
7. The NSSF 110 identifies the need to request the specific feedback 101 for Influencing UE registration. The NSSF 110 invokes Nnwdaf_AnalyticsInfo Request( ) operation from NWDAF 100 including in this support request 111 the Feedback Type, the Specific target Data Structure, the Feedback Category, and includes the filters the information about the UE 200 that is requesting the registration. This information includes the S-NSSAIs related to the UE 200 subscription or requested S-NSSAIs (if included in the UE registration and received by NSSF 110).
8. The NWDAF 100 receives the request 111, applies the filters of the requested specific feedback 101, which in this case is the identification of the UE requesting registration and the set of requested or default S-NSSAIs associated with such UE 200.
9. The NWDAF 100 calculates the requested feedback 101.
10. The NWDAF 100 sends the Nnwdaf_AnalyticsInfo Request response( ) with the generated feedback 101 including, including the fields Feedback Type (FT), Specific Target Data Structure (STDS) values, and the timestamp of the feedback generation (TS). The STDS is composed of an ordered list of S-NSSAIs and associated NSI IDs with a normalized value between 0-1, where 0 is the lowest and 1 the highest probability of a S-NSSAIs and NSI IDs to be able to accommodate the traffic of the UE requesting registration.
11. The NSSF 110 uses the list of S-NSSAIs and NSI IDs with their probability values, and optionally further operator's policy to select the allowed S-NSSAIs and NSI IDs for the UE 200, as well as the list of AMFs that can support the UE registration on the allowed S-NSSAIs and NSI IDs.
12. The NSSF 110 sends the Nnssf_NSSFSelection_Get response( ) to the initial AMF 401.

13. Steps 5 to 8 defined in Figure 4.2.2.2.3-1 in TS 23.502 for the Registration with AMF re-allocation procedure are executed.

Once the NSSF 110 defined the list of allowed S-NSSAIs and NSI IDs, it also defines the AMFs that can finalize the UE registration and later handle the UE requests associated with the allowed S-NSSAIs. The NSSF 110 answers, in Step 12, the Initial AMF request with the list of AMFs, allowed S-NSSAIs and NSI IDs, and UE registration procedure proceeds from step 5 in Figure 4.2.2.2.3-1: Registration with AMF re-allocation procedure in TS 23.502.

Figure 5:
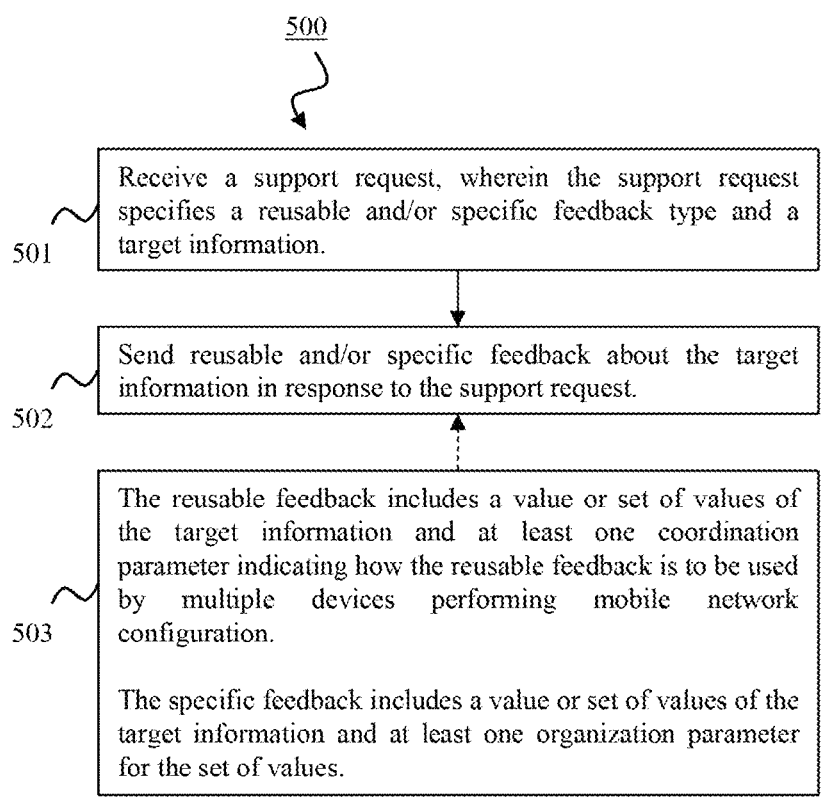
FIG. 5 shows a method according to an embodiment for generating feedback for supporting a mobile network configuration and/or change.

FIG. 5 shows a method according to an embodiment. The method is for generating feedback 101 for supporting a mobile network configuration and/or change. Accordingly, the method 500 may be carried out by the device 100 shown in and explained with respect to FIG. 1. The method 500 comprises a step 501 of receiving a support request 111, wherein the support request 111 specifies a reusable and/or specific feedback type 112 and a target information 113. The method 500 further comprises a step 502 of sending reusable and/or specific feedback 101 about the target information 113 in response to the support request 111.

In the above step 502, according to box 503, the reusable feedback 101 includes a value 102 or set of values 102 of the target information 113 and at least one coordination parameter 103 indicating how the reusable feedback 101 is to be used by multiple devices 110 performing mobile network configuration and/or change. Further, the specific feedback 101 includes a value 102 or set of values 102 of the target information 113 and at least one organization parameter 104 for the set of values 102.

Figure 6:
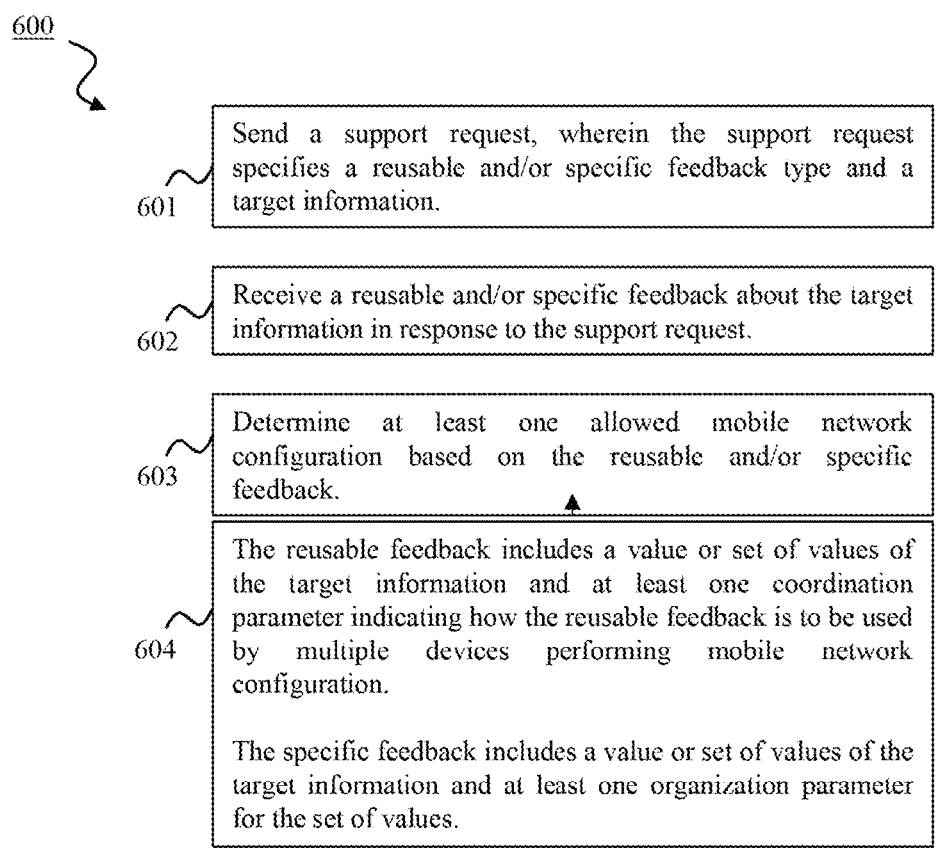
FIG. 6 shows a method according to an embodiment for performing a mobile network configuration and/or change.

FIG. 6 shows a method 600 according to an embodiment for configuring and/or changing a mobile network. Accordingly, the method 600 may be carried out by the device 110 shown in and explained with respect to FIG. 1. The method 600 comprises a step 601 of sending a support request 111, wherein the support request 111 specifies a reusable and/or specific feedback type 112 and a target information 113. Further, the method 600 comprises a step 602 of receiving a reusable and/or specific feedback 101 about the target information 113 in response to the support request 111. The method 600 also comprises a step 603 of determining at least one mobile network configuration and/or change based on the reusable and/or specific feedback 101.

In the above steps 602 and 603, according to box 604, the reusable feedback 101 includes a value 102 or set of values 102 of the target information 113 and at least one coordination parameter 103 indicating how the reusable feedback 101 is to be used by multiple devices 110 performing mobile network configuration and/or change. Further, the specific feedback 101 includes a value 102 or set of values 102 of the target information 113 and at least one organization parameter 104 for the set of values 102.

The subject matter of the present disclosure has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for generating feedback for supporting a mobile network configuration or change, the device comprising:
   a processor; and
   a non-transitory computer-readable storage medium coupled to the processor and storing processor-executable instructions that, when executed by the processor, facilitate carrying out a method comprising:
      obtaining a support request of a device for performing the mobile network configuration or change, wherein the support request specifies a specific feedback type and target information, and wherein:
         the mobile network configuration or change includes a registration of user equipment (UE) to a network slice (NS) or network slice instance (NSI), and/or
         the target information is information about at least one NS or NSI capable of supporting a type of service or application of the UE; and
      determining specific feedback about the target information in response to the support request,
      wherein the specific feedback includes a set of values of the target information that are ranked based on at least one organization parameter in the specific feedback for the set of values.

2. The device according to claim 1, wherein the method further comprises:
   collecting data about a network configuration or change about at least one of the group consisting of: an NS, an NSI, and a UE; and
   generating the specific feedback based on the collected data.

3. The device according to claim 2, wherein the data about a network configuration or change includes at least one type of data take from the group consisting of:
   past behavior of the UE;
   NS or NSI configuration information;
   NS or NSI network load; and
   a mapping of a plurality of equivalent NSIs.

4. The device according to claim 2, wherein the data about a network configuration or change comprises data regarding at least one NSI, and wherein the data regarding at least one NSI includes at least one type of data taken from the group consisting of:
   NS and NSI mapping;
   NSI topology information;
   mobile service level (MSL) information mapping to NS and NSI topology;
   radio access network (RAN) and core network (CN) association; and
   RAN configuration information associated with the NSI.

5. The device according to claim 2, wherein the data about a network configuration or change comprises data regarding at least one NS, and wherein the data regarding at least on NS includes at least one type of data taken from the group consisting of:
   a network load of the NS or of one or more NSIs of the NS;
   a network latency or network throughput per type of service;
   a notification about a quality of service (QoS) non-fulfillment; and
   QoS experienced by one or more UEs of a given type of service.

6. The device according to claim 2, wherein the data about a network configuration or change comprises data regarding at least one UE, and wherein the data regarding at least one UE includes at least one type of data taken from the group consisting of:
 a session historical behavior of the UE or of one or more other UEs; and
 a type of services or application used in the past by the UE or by one or more other UEs; and
 a network usage on a per UE basis.

7. The device according to claim 1, wherein the support request, as the target information, includes:
 at least one NS requested by UE, or
 at least one default NS for UE and the UE identification, and
 wherein the specific feedback includes:
 a current load value for multiple NSs or NSIs and a ranking of the NSs or NSIs according to current load values associated with the NSs or NSIs, and/or
 a capability of the NS or NSI to accommodate the UE traffic requirements.

8. The device according to one of the claim 6, wherein the data regarding at least one UE includes at least one type of data taken from the group consisting of: a UE ID, an Application ID, and an S-NSSAI.

9. The device according to claim 1, wherein the specific feedback is a type of analytics generated by an analytics function.

10. The device according to claim 1, wherein values of the set of values are ranked from a lowest value to a highest value, or from a highest value to a lowest value.

11. A device for configuring or changing a mobile network, the device comprising:
 a processor; and
 a non-transitory computer-readable storage medium coupled to the processor and storing processor-executable instructions that, when executed by the processor, facilitate carrying out a method comprising:
  determining a support request to a device for generating feedback for supporting the configuration or change of the mobile network, wherein the support request specifies a specific feedback type and a target information, wherein:
   the mobile network configuration or change includes a registration of user equipment (UE) to a network slice (NS) or network slice instance (NSI), and/or
   the target information is information about at least one NS or NSI capable of supporting a type of service or application of the UE; and
  obtaining specific feedback about the target information in response to the support request, and
  determining a configuration or change of the mobile network based on the specific feedback,
  wherein the specific feedback includes a set of values of the target information that are ranked based on at least one organization parameter in the specific feedback for the set of values.

12. The device according to claim 11, wherein the method further comprises:
 subscribing to a service provided by the device for generating the feedback enabling the support requests and obtaining the specific feedback.

13. The device according to one of the claim 11, wherein the method further comprises:
 collecting auxiliary information in accordance with finding the specific feedback insufficient to determine the at least one mobile network configuration or change, and
 determining the at least one mobile network configuration or change based further on the auxiliary information.

14. A method for generating feedback for supporting a mobile network configuration or change, the method comprising:
 obtaining a support request from a device for performing the mobile network configuration or change, wherein the support request specifies a specific feedback type and target information, and wherein:
  the mobile network configuration or change includes a registration of user equipment (UE) to a network slice (NS) or network slice instance (NSI), and/or
  the target information is information about at least one NS or NSI capable of supporting a type of service or application of the UE; and
 determining specific feedback about the target information in response to the support request,
 wherein the specific feedback includes a set of values of the target information that are ranked based on at least one organization parameter in the specific feedback for the set of values.

15. The method according to claim 14 further comprising:
 collecting data about a network configuration or change about at least one of the group consisting of: an NS, an NSI, and a UE; and
 generating the specific feedback based on the collected data.

16. The method according to claim 14, wherein the specific feedback is a type of analytics generated by an analytics function.

17. The method according to claim 14, wherein values of the set of values are ranked from a lowest value to a highest value, or from a highest value to a lowest value.

* * * * *